Aug. 5, 1947. N. MADSEN 2,425,106
METHOD OF SHARPENING LAWN MOWERS
Original Filed May 24, 1943 3 Sheets-Sheet 1

INVENTOR:
NILS MADSEN,
BY HARRIS, KIECH, FOSTER & HARRIS,

FOR THE FIRM
ATTORNEYS.

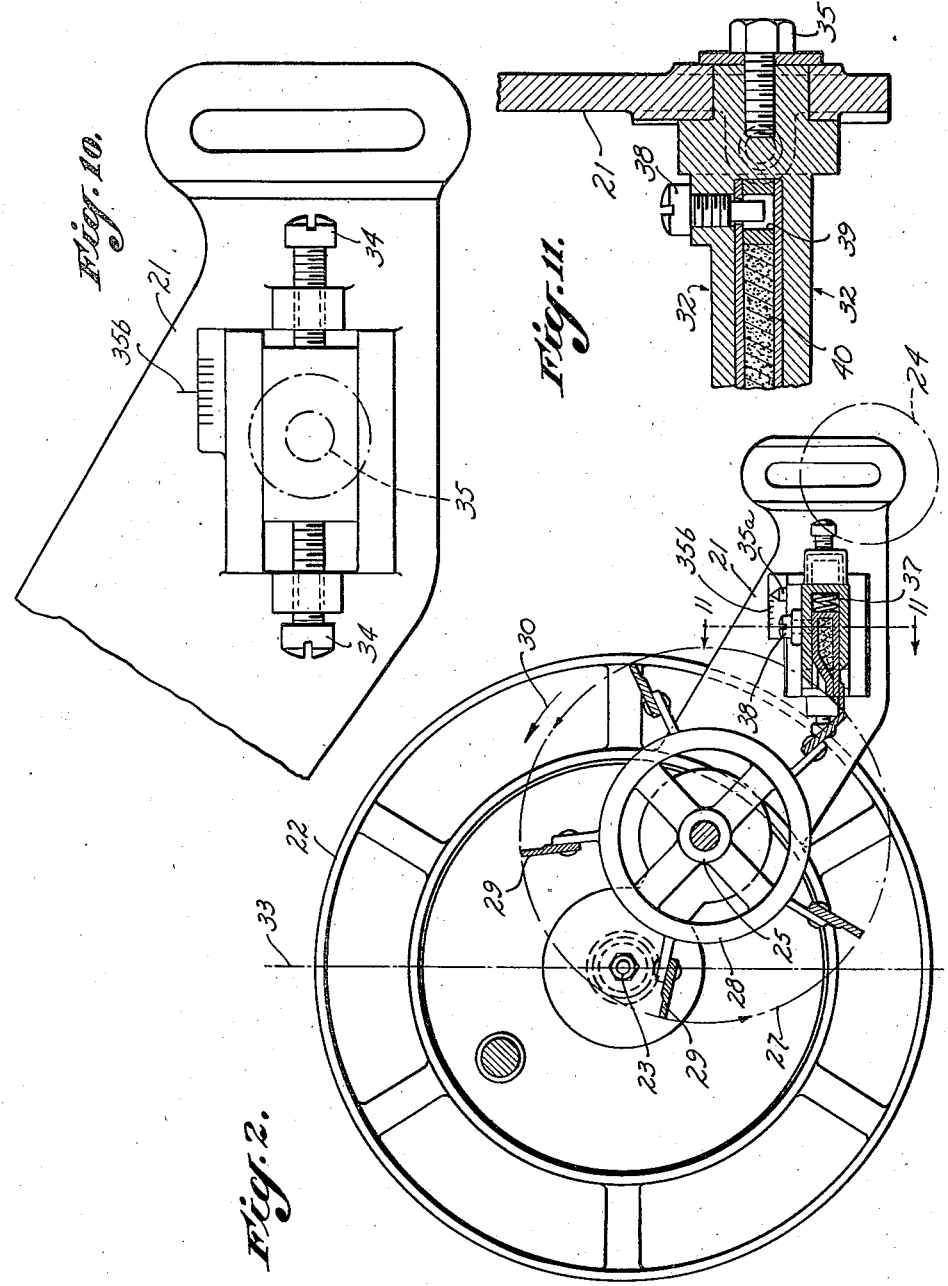

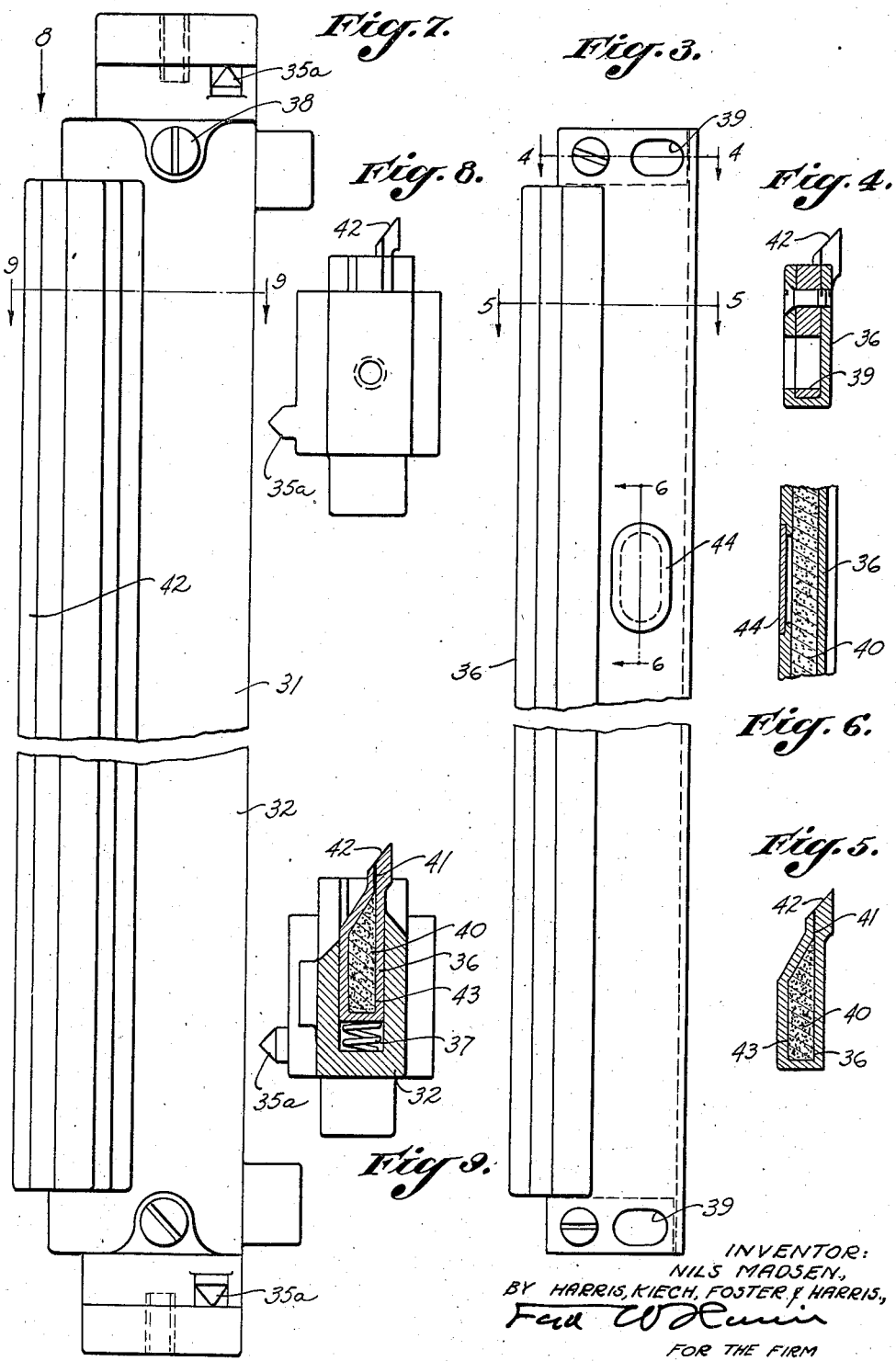

Patented Aug. 5, 1947

2,425,106

UNITED STATES PATENT OFFICE 2,425,106

METHOD OF SHARPENING LAWN MOWERS

Nils Madsen, San Pedro, Calif.

Original application May 24, 1943, Serial No. 488,134. Divided and this application June 20, 1944, Serial No. 541,150

2 Claims. (Cl. 51—281)

This application is a division of my copending application Serial No. 488,134, filed May 24, 1943, entitled "Lawn mower."

My invention relates to machines for cutting off close to the ground various standing vegetation, and it is particularly applicable to so cutting grasses, such machines being commonly called "mowers." In the embodiment shown and hereinafter described as an example of how my invention may be used, it is applied to a lawn mower, that is, a machine for clipping the grass of lawns to produce a smooth and even effect.

Such machines are ordinarily made with a rotating blade or blades which are turned by the wheels of the lawn mower as it is propelled over the surface of the ground, these rotating blades moving across a blade which is carried by the frame of the mower. The rotating blades are commonly helical, and the coacting blade is straight. My invention relates to the straight blade. Lawn mowers of this type cut the grass by the shearing action of the helical blades coacting with the straight blade. This action is similar to that of a pair of scissors, in which each blade has a flat side, these flat sides being held in contact with each other, the leading edges of the flat or primary surfaces forming the cutter edge. The other or secondary surface of each blade, which also terminates at the cutting edge, may be at 90° or some other relatively obtuse angle to the primary surface.

The cutting edges of the blades of a lawn mower, like those of a pair of scissors, become rounded off or dulled with use, and the cutting edge or corner formed by the primary and secondary surfaces may be restored to its initial sharpness by removing material from either or both surfaces. Although the grass itself is easily cut, the blades of a lawn mower tend to become dulled due to the presence of sand or grit on the grass itself or foreign bodies in the lawn, and the cutting edges of the blade of ordinary lawn mowers must be frequently renewed or sharpened.

It is an object of my invention to provide means to progressively remove material from the coacting surfaces of both the helical and the straight blades so that the cutting edges of both blades are maintained in their initial sharpened condition.

Like a pair of scissors, the blades of a lawn mower cut by closing on grass in the angle between the two blades, and the apex of this angle is hereinafter termed the point of contact of the blades. It is necessary that the cutting edges of two coacting blades be in intimate contact with each other at the point of contact at all times.

In lawn mowers, as previously constructed, the helical rotating knives rotate about an axis fixed with relation to the frame of the mower. The straight blade is set so that the cutting edge is fixed with relation to the frame of the mower in a position such that, as each of the helical blades rotates and its point of contact moves along the straight blade, the cutting edge of the helical blade is at all times in intimate contact with the straight blade at its point of contact. This requires careful adjustment of the straight blade with relation to the frame of the mower. It is a further object of my invention to provide spring means for insuring that the blades shall be at all times in intimate contact with each other at the point of contact without its being necessary to initially adjust the straight blade in the frame within narrow limits of the theoretically perfect position of said blade. Such an arrangement has the further advantage that, as the blades wear away due to the abrasion of the primary surfaces by use and by the previously described sharpening action, intimate contact at the contact point is maintained.

It is a further object of my invention to provide means whereby the pressure of the coacting blades adjacent the contact point can be so adjusted that it is not excessive but adequate to provide a clean cut, and so that this pressure remains substantially constant as the contact point moves along the straight and helical blades due to the rotation of the helical blades.

Further objects and advantages will be more fully described hereinafter.

The following description sets forth how my invention may be applied to a lawn mower of a form now in common use, and the appended drawings illustrate the specification.

In these drawings,

Fig. 2 is an end elevation of this lawn mower, certain parts being shown in section.

Fig. 3 is a plan of the straight blade assembly.

Fig. 4 is a section on a plane indicated by the line 4—4 of Fig. 3 as viewed in the direction of the arrows at the ends of this line.

Fig. 5 is a section on a plane indicated by the line 5—5 of Fig. 3 as viewed in the direction of the arrows at the ends of this line.

Fig. 6 is a partial section on a plane indicated by the line 6—6 of Fig. 3, this section being viewed in the direction of the arrows at the ends of this line.

Fig. 7 is a plan view of a cutter bar assembly.

Fig. 8 is an elevation of the assembly shown in Fig. 7, this assembly being viewed in the direction of the arrow 8 of Fig. 7.

Fig. 9 is a section on a plane indicated by the line 9—9 of Fig. 7, this section being viewed in the direction of the arrows at the ends of this line.

Fig. 10 is an elevation of a portion of the mechanism shown in Fig. 2 on a somewhat larger scale than Fig. 2.

Fig. 11 is a section on the same scale as Fig. 10 on a plane indicated by the line 2—2 of Fig. 2, this section being viewed as indicated by the arrows at the ends of this line.

Figure 1:
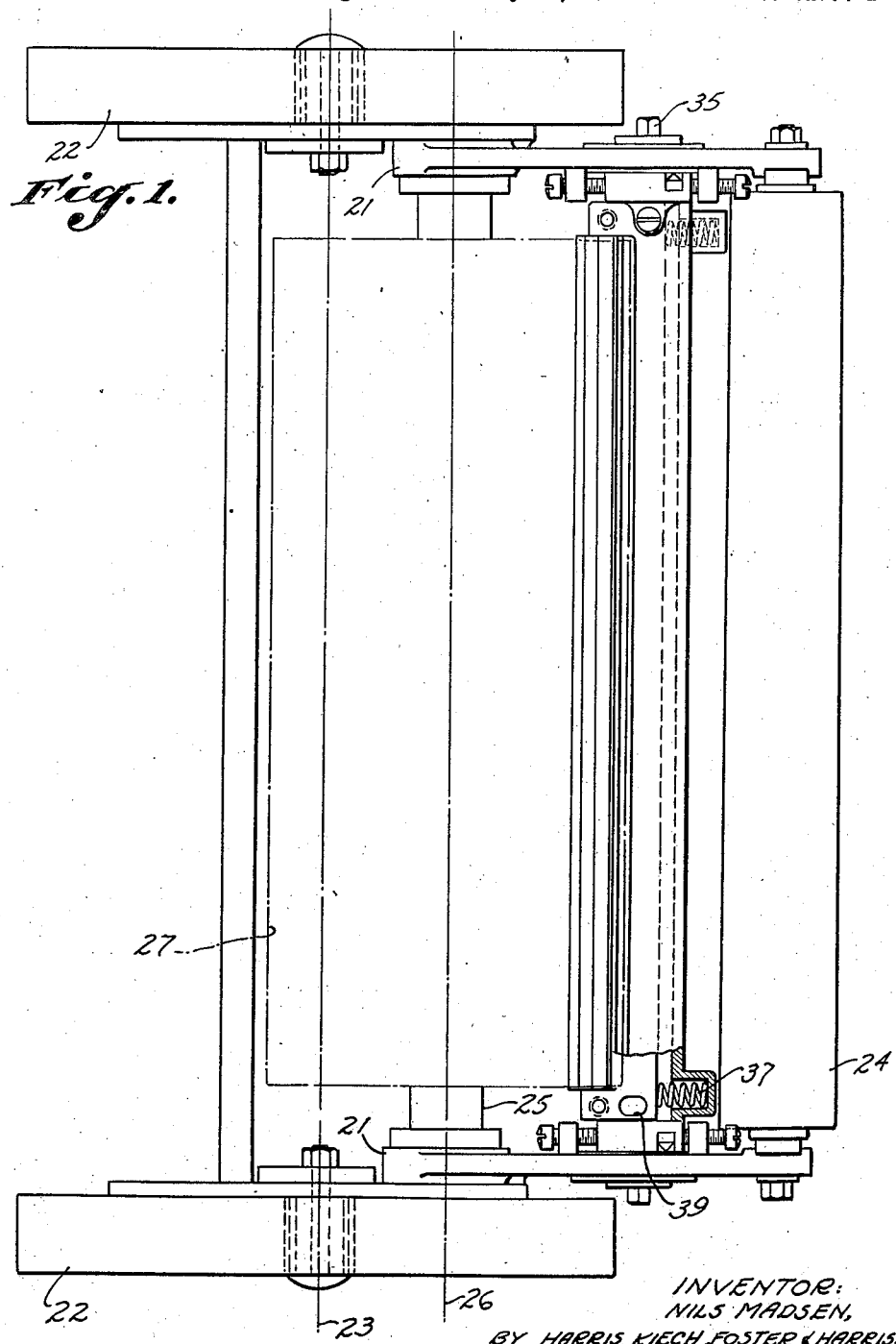
Fig. 1 is a plan view of a lawn mower embodying my invention, the rotating knives which are found on such lawn mowers being indicated by dot-and-dash lines showing their path of movement, and certain parts being shown in section.

The lawn mower as illustrated consists of a frame 21 which is supported on wheels 22 which turn about a wheel axis 23. Mounted so as to be movable vertically in the frame 21 is a roller 24. The mower may be manually propelled by a handle mechanism (not shown) or by a power driven mechanism (not shown). Mounted on a shaft 25 turning about an axis 26 is a helical blade assembly 27. This assembly consists of spiders 28 fixed to the shaft 25 and helical blades 29. The shaft 25 is rotated from the wheels 22 by gearing (not shown). The blades 29 are helical about the axis 26. The helical peripheries of the blades 29 lie in a cylinder indicated by dot-and-dash lines in Fig. 1, the blades being rotated in a counterclockwise direction as viewed in Fig. 2 and indicated by the arrow 30. The above described parts are all common to lawn mowers now in common use.

In lawn mowers now in common use, a cutter bar assembly is provided, and I provide such an assembly 31. My cutter bar assembly is, however, new and produces certain new results. It consists of a cutter bar holder 32 which is so mounted that it can be moved toward or away from the vertical plane of the mower, this plane being indicated by the line 33 of Fig. 2. The horizontal position of the holder 32 is adjusted by set-screws 34, the holder then being clamped in position by a cap-screw 35, as shown in Figs. 10 and 11. The cutter bar holder 32 is provided with pointers 35a which register with a mark 35b on the frame 21 to facilitate adjustment of the cutter bar in the frame, as shown in Figs. 8, 9, and 10.

The holder 32 has a slot extending longitudinally therethrough, as shown in Fig. 9, and a cutter bar 36 is placed in this slot. The cutter bar 36 is impelled toward the plane 33 by two compression springs 37 carried in recesses in the cutter bar holder 32, these springs being shown in Figs. 1, 2, and 9, and the cutter bar 36 is prevented from being entirely ejected from the slot in the cutter bar holder by screws 38 shown in Figs. 2, 11, and 7 which engage slots 39 shown in Figs. 3, 4, and 1. The cutter bar 36 is made of hard steel and has a central cavity 40 which is closed at the ends but which is open through a small slot 41 to the edge 42 of the cutter bar. The cavity 40 is filled with an abrasive or an oil containing an abrasive, such as fine emery powder or carborundum powder 43, through an opening closed by a cover 44, as shown in Figs. 3 and 6. As the blades 29 rotate, they tend to vibrate the cutter bar and feed abrasive through the slot 41.

There are several advantages due to this arrangement of the cutter bar assembly. The springs 37 are selected to hold the cutter bar 36 against the blades 29, the cutter bar being, of course, the straight blade of the cutting combination. The blades 29 are sufficiently helical that before one blade 29 goes out of contact with one end of the cutter bar 36, the succeeding blade engages the bar. The contact of the bar 36 with each of the blades 29 is at a point immediately adjacent the contact point of the cutting edges of the bar and blades, and this contact is an elastic one so that the contact is at constant pressure, the cutter bar holder 32 being so adjusted in the frame that this contact is maintained as the cutter bar 36 wears away. The abrasive 43 is fed slowly to the edge 42 of the cutter bar 36 through the slot 41. It is important to note that this abrasive adheres to both the cutter bar 36 and the outer edges of the blades 29, and both the outer edges of the blades and the edge 42 of the cutter bar 36 are worn away so that the cutting edges of both blades and bar are kept sharp. As the blades and bar wear away, contact between them is maintained by the springs 37. Wear beyond the capacity of the springs 37 is compensated for from time to time by adjusting the position of the cutter bar holder by the screws 34 and cap-screw 35. The mower will, however, operate over long periods due to the springs 37 without adjusting the screws 34 and 35.

By the use of my invention, the contact between the cutter bar 36 or straight blade and the helical blades 29 is at all times maintained at sufficient pressure to insure a proper cut, and, due to the use of the abrasive 43, the cutting edges are always sharp.

I claim as my invention:

1. The method of continuously sharpening the blades of a lawn mower, which comprises, relatively moving the surface of one blade across the surface of another blade, yieldably urging one of said surfaces into contact with the other, and feeding an abrasive between said surfaces while they are in contact and along a path passing through one of the surfaces.

2. The method of constantly sharpening the blades of a lawn mower, which comprises, relatively moving a surface of one blade past an opposed surface of another blade, yieldably urging one of said surfaces toward the other, and feeding abrasive particles into the space between the opposing surfaces while they are opposed and along a path passing through one of the surfaces.

NILS MADSEN.

REFERENCES CITED

The following references are of record in the file of this patent:

UNITED STATES PATENTS

| Number | Name | Date |
| --- | --- | --- |
| 1,367,703 | Johnson | Feb. 8, 1921 |
| 1,497,650 | Mead | June 10, 1924 |
| 1,513,276 | Royer | Oct. 28, 1924 |
| 2,174,204 | Dunn | Sept. 26, 1939 |
| 2,204,293 | Beaver | June 11, 1940 |
| 2,343,072 | Miller | Feb. 29, 1944 |
| 1,287,073 | Mitchell | Dec. 10, 1918 |

FOREIGN PATENTS

| Number | Country | Date |
| --- | --- | --- |
| 349,059 | Germany | Feb. 23, 1922 |